Aug. 25, 1964    V. P. BAYLEY    3,145,484
METHOD AND APPARATUS FOR IMPARTING AND RECORDING
COMPARATIVE INSTRUCTION OF A MOTION SKILL
Filed Sept. 15, 1961
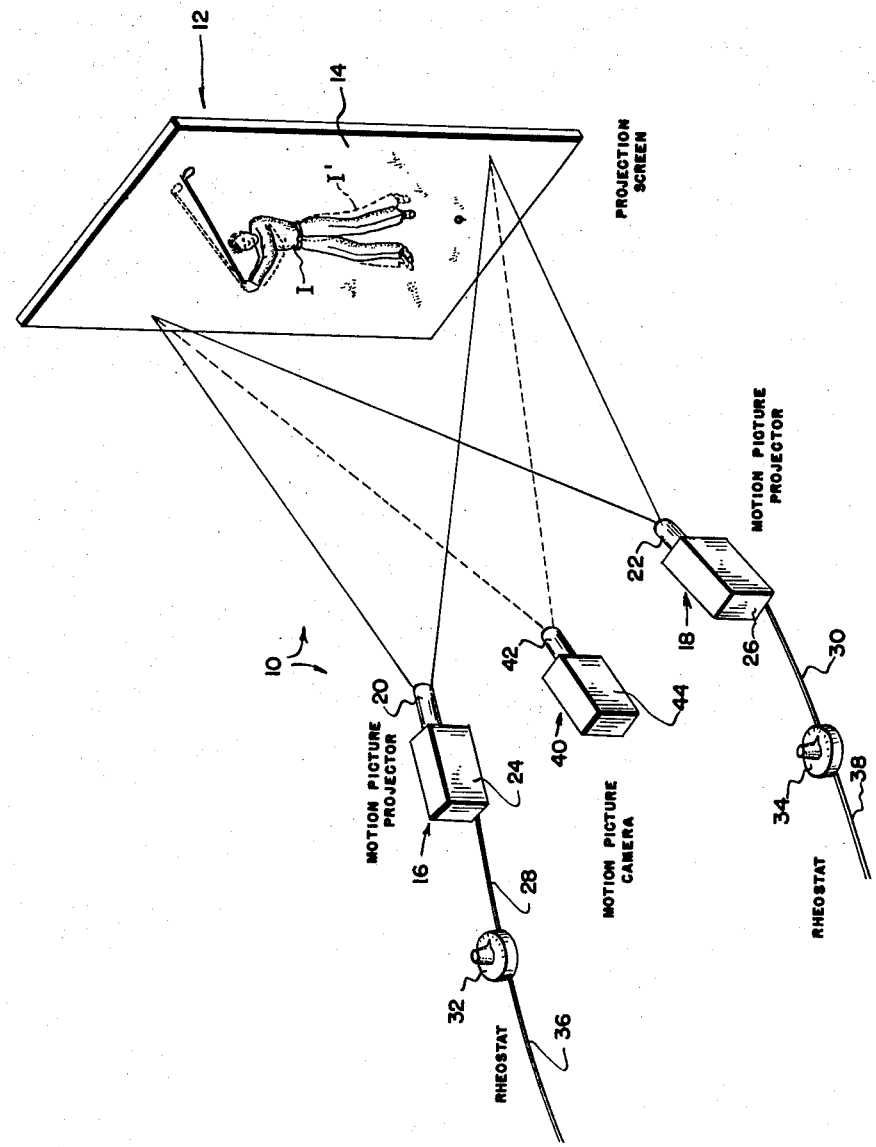
INVENTOR.
VOLNEY P. BAYLEY.
BY  Barthel & Bugbee
ATTORNEYS.

United States Patent Office 3,145,484
Patented Aug. 25, 1964

3,145,484
METHOD AND APPARATUS FOR IMPARTING AND RECORDING COMPARATIVE INSTRUCTION OF A MOTION SKILL
Volney P. Bayley, 19155 Glendale Ave., Detroit 23, Mich.
Filed Sept. 15, 1961, Ser. No. 138,388
5 Claims. (Cl. 35—29)

This invention relates to optical instruction devices and, in particular, to motion picture instruction systems and devices.

One object of this invention it to provide a motion picture system and apparatus for instructing persons in manual skills, such as sports, by superimposing upon an instructor's cinematographic demonstration of the skill or sport a pupil's cinematographic demonstration of the same skill or sport, with the two motion picture films taken from the same viewpoint and operated in synchronism with one another so that departures by the pupil from the instructor's mode of action are immediately apparent.

Another object is to provide a motion picture instruction system and apparatus of the foregoing character wherein the superimposed, simultaneously-projected and synchronized cinematographic images of the instructor and pupil are photographed by a motion picture camera during propection on the screen, thereby obtaining a permanent record comparing the performance of the pupil with that of the instructor and enabling the pupil and instructor to study the film for improvement of the pupil's technique.

Another object is to provide a motion picture instruction system and apparatus as set forth in the object immediately preceding, wherein the comparative film, after development, may be sent to the pupil, who can thereby be located at a great distance from the instructor without diminishing the instructional value of the apparatus.

Other objects and advantages of the invention will become apparent during the course of the following description of the accompanying drawing which shows one form of apparatus, according to the invention, for carrying out the system of instruction of the present invention.

Referring to the drawing in detail, there is shown a motion-picture instruction apparatus, generally designated 10, according to one form of the invention, for carrying out the instruction system of the invention. The apparatus 10 includes a projection screen 12 of any suitable type having a front surface 14 adapted to receive and reflect images projected by conventional motion picture projectors 16 and 18 also of any suitable type having projection lenses 20 and 22 of suitable focal length according to the "throw" or distance for the convenient location of the projection screen 12 from the projectors 16 and 18.

It will be understood that the projectors 16 and 18 are operated by conventional motors, such as variable speed electric motors, within their respective housings 24 or 26, current being supplied thereto through conductor cables 28 and 30 containing rheostats 32 and 34 respectively for adjusting their respective speeds. The rheostats 32 and 34 receive current from conductor cables 36 and 38 which in turn are connected to a source of current electricity, such as to conventional outlets of a house lighting circuit.

In order to obtain a permanent record of the superimposed images I and I' of the performance film records of the instructor and pupil respectively, as projected upon the surface 14 of the projecting screen 12, there is also provided, preferably at a location between the motion picture projectors 16 and 18, a motion picture camera 40 having an objective lens 42 mounted on a housing 44 containing conventional motion picture camera mechanism and adapted to receive the usual reels or spools of motion picture film for supply and take-up or reception of film after exposure through the objective lens 42.

For clarity of disclosure, the motion picture projectors 16 and 18 are shown separated at some distance laterally from one another. In actual practice, however, and for efficient and accurate optical performance, it is preferable to place them rather close to one another, side by side at the same distances from the screen 12, assuming the projection lenses 20 and 22 to be the same focal length and the projection films to have been taken with cameras having lenses of substantially the same focal length. In order to insure reproduction of the motions of the instructor and pupil respectively, it will also be found convenient to mount the two motion picture projectors 16 and 18 upon a common base (not shown) or even in a common housing (not shown). This also facilitates convenient storage and transportation of the projector part of the apparatus 10, as well as enabling rapid and accurate set-up of the apparatus for projection.

In the photographing part of the instruction system of the present invention, care is taken that the instructor and pupil successively occupy as nearly as possible the same positions relatively to the camera, either a single camera with separate rolls of film being used or two separate cameras loaded with separate rolls of film. Alternatively, the record can be taken of the performances of the instructor and pupil successively upon the same spool or reel of film in the same camera with the separate portions of film severed and mounted, after development, upon separate reels for projection from the separate motion picture projectors 16 and 18. Specifically, the instructor first performs the skill intended to be imparted to the pupil, such as, for example, the golf swing illustrated in the drawing and this is photographed by the motion picture camera. The pupil then assumes as nearly as possible the same position relatively to the motion picture camera, and attempts to carry out the same motion or swing, this being likewise recorded by the motion picture camera. The film or films containing the separate records of performance by the instructor and pupil are then developed and mounted on reels in the usual way.

In carrying out the projection part of the system, the motion picture projectors 16 and 18 are loaded with the respective performance record film reels of the pupil and instructor and focussed upon the screen 12 so that the projected images I and I' of the instructor and pupil respectively appear as nearly as possible in super position. In the drawing, the projected image of the instructor is shown, for camparative purposes, in solid lines and that of the pupil in dotted lines, at any given instant. Synchronization of the two projectors 16 and 18 is obtained by adjustment of their respective rheostats 32 and 34. When the respective projectors 16 and 18 are thus operated in synchronism, the moving images of the instructor and pupil appear superimposed on the surface 14 of the screen 12, and any departures from proper or intended procedure become immediately apparent by the deviation of the image of the pupil's body motions from those of the instructor.

During such projection, in order to obtain a permanent comparative record, the motion picture camera 40 is optionally operated to photograph the moving superimposed images of the instructor and pupil, thus preserving the record of progress of instruction and also enabling a print of the record film to be mailed to the pupil, who may be at a considerable distance from the instructor. Successive films may be taken at different periods of instrution in the manner set forth above, so that the progress of the instruction cannot only be observed but preserved as a permanent record. Moreover, the motion picture projectors 16 and 18 can be slowed down during projection, or the films taken with high speed cameras so that the motions can be projected in slow motion and therefore correction of mistakes can be more easily effected. In this manner, a more effective instruction can be imparted by the instructor to the pupil than by emulation of movement alone, especially in the teaching of sports such as golf, baseball or tennis, where the action takes place so rapidly that it is ordinarily difficult for both the instructor and pupil to correct the pupil's errors.

It will be understood that instead of mounting the motion picture projectors 16 and 18 side by side, as shown, one may be mounted over the other to obtain substantially the same result. In both respects, the projectors are disposed substantially adjacent one another in transversely-aligned relationship. It will also be evident that the motion picture camera 40 does not necessarily require positioning in transversely-aligned relationship with the projectors 16 and 18, but its objective lens 42 may be of greater or lesser focal length, thus placing it further from or nearer to the projection surface 14 of the screen 12.

What I claim is:

1. A method of imparting and recording comparative instruction of a particular motion skill from an instructor to a pupil, comprising making a cinematographic record of the performance of said particular motion skill by the instructor, making a cinematographic record of the performance of the same particular motion skill by the pupil from substantially the same viewing point, simultaneously cinematographically projecting the images of said records in superimposed synchronized relationship upon a projection image-receiving surface, and maintaining corresponding points in the thus-superimposed images approximately coincident with one another during the simultaneous synchronized superimposed projection thereof.

2. A method of imparting and recording comparative instruction of a motion skill, according to claim 1, including the step of making a combined cinematographic record of the said superimposed images during the simultaneously synchronized superimposed projection thereof.

3. A method of imparting and recording comparative instruction of a motion skill, according to claim 2, including the further step of cinematographically projecting the image of the combined record upon a projection image-receiving surface.

4. An apparatus for imparting and recording comparative instruction of a particular motion skill from an instructor to a pupil, comprising a projection image-receiving structure, a first motion picture projector focussed upon said structure, a first cinematographic record of the performance of a particular motion skill by the instructor mounted in projecting relationship within said first projector, a second motion picture projector also focussed upon said structure in image-superimposing relationship with the first motion-picture projector, a second cinematographic record of the performance of the same particular motion skill by the pupil photographed from substantially the same viewing point mounted in projecting relationship within said second projector, and means for synchronizing the operation of the first and second projectors to maintain synchronized superimposition of the images of said first and second cinematographic records from said first and second projectors upon said structure with corresponding points in the superimposed images disposed in approximate coincidence with one another.

5. An apparatus, according to claim 4, wherein a motion picture camera is mounted in cinematographic recording relationship with said structure relatively to said projectors and focussed upon said superimposed approximately-concident cinematographic images.

References Cited in the file of this patent

UNITED STATES PATENTS

| | | |
|---|---|---|
| 1,945,926 | Tolhurst | Feb. 6, 1934 |
| 2,494,000 | Robertson | Jan. 10, 1950 |
| 2,727,429 | Jenkins | Dec. 20, 1955 |
| 2,939,224 | Rose et al. | June 7, 1960 |